United States Patent
Stählin et al.

(10) Patent No.: US 11,218,849 B2
(45) Date of Patent: Jan. 4, 2022

(54) VEHICLE TO X COMMUNICATIONS SYSTEM FOR A VEHICLE

(71) Applicant: Continental Teves AG & Co. oHG, Frankfurt am Main (DE)

(72) Inventors: Ulrich Stählin, Rochester, MI (US); Marc Menzel, Weimar (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 253 days.

(21) Appl. No.: 16/468,456

(22) PCT Filed: Dec. 20, 2017

(86) PCT No.: PCT/DE2017/200139
§ 371 (c)(1),
(2) Date: Jun. 11, 2019

(87) PCT Pub. No.: WO2018/113859
PCT Pub. Date: Jun. 28, 2018

(65) Prior Publication Data
US 2020/0196119 A1    Jun. 18, 2020

(30) Foreign Application Priority Data
Dec. 22, 2016 (DE) ............ 10 2016 226 053.7

(51) Int. Cl.
*H04W 4/42* (2018.01)
*G08G 1/01* (2006.01)
(Continued)

(52) U.S. Cl.
CPC ........... *H04W 4/40* (2018.02); *G08G 1/0104* (2013.01); *H04B 1/56* (2013.01); *H04W 88/06* (2013.01)

(58) Field of Classification Search
USPC ........................................ 370/320
See application file for complete search history.

(56) References Cited

U.S. PATENT DOCUMENTS 9,048,535 B1* 6/2015 Desclos ............... H01Q 5/321
2003/0060221 A1* 3/2003 Eberlein ............... H04W 16/10
                                                                    455/503

(Continued)

FOREIGN PATENT DOCUMENTS

| DE | 102015201476 A1 | 7/2016 |
| WO | 2015121404 A1 | 8/2015 |
| WO | 2016177521 A1 | 11/2016 |

OTHER PUBLICATIONS

German Search Report for German Application No. 10 2016 226 053.7, with partial translation, dated Sep. 18, 2017—12 pages.

(Continued)

*Primary Examiner* — Gregory B Sefcheck
*Assistant Examiner* — Majid Esmaeilian
(74) *Attorney, Agent, or Firm* — RatnerPrestia

(57) ABSTRACT

A vehicle-to-X communications system for a vehicle, includes first antenna, a second antenna, a first transceiver for transmitting and receiving a signal, the first transceiver electrically connectable to the first antenna via a first antenna interface, a second transceiver for transmitting and receiving a signal, the second transceiver electrically connectable to the second antenna via a second antenna interface, a control device connectable to the first transceiver via a first communications interface and to the second transceiver via a second communications interface. The first transceiver and the second transceiver are configured to communicate with the control device independently of one another and, further, to transmit and receive a signal independently of one another via their first antenna and the second antenna.

19 Claims, 3 Drawing Sheets

(51) Int. Cl.
*H04B 1/56* (2006.01)
*H04W 4/40* (2018.01)
*H04W 88/06* (2009.01)

(56) References Cited

U.S. PATENT DOCUMENTS

| | | |
|---|---|---|
| 2012/0239294 A1 | 9/2012 | Stählin et al. |
| 2014/0266953 A1* | 9/2014 | Yen .................. H01Q 9/065 343/818 |
| 2015/0310723 A1* | 10/2015 | Pinkerton ............ G08B 21/187 340/870.09 |
| 2016/0227508 A1* | 8/2016 | Katabi ..................... H04B 7/26 |
| 2017/0012657 A1 | 1/2017 | Stählin et al. |
| 2018/0075670 A1* | 3/2018 | Rajakondala ......... H04W 4/029 |
| 2018/0199346 A1* | 7/2018 | Hou ....................... H04W 4/40 |
| 2018/0213420 A1 | 7/2018 | Simsek |

OTHER PUBLICATIONS

International Search Report and Written Opinion for International Application No. PCT/DE2017/200139, dated June 7, 2018—20 pages.

European Communication pursuant to Article 94(3) for European Application No. 17 835 583.0, dated Jun. 16, 2021, with translation, 11 pages.

\* cited by examiner

VEHICLE TO X COMMUNICATIONS SYSTEM FOR A VEHICLE

CROSS REFERENCE TO RELATED APPLICATIONS

This application is the U.S. National Phase Application of PCT International Application No. PCT/DE2017/200139, filed Dec. 20, 2017, which claims priority to German Patent Application No. 10 2016 226 053.7, filed Dec. 22, 2016, the contents of such applications being incorporated by reference herein.

FIELD OF THE INVENTION

The present invention relates to a vehicle-to-X communications system for a vehicle for implementing a multi-antenna system for Car2X applications and to a vehicle with a vehicle-to-X communications system.

BACKGROUND OF THE INVENTION

A Car2X communications system with which modern vehicles will soon be outfitted refers to a communications technology by means of which a vehicle is able to exchange information with other road users (Car2Car) and infrastructures (Car2Infrastructure) via a radio link by means of a so-called vehicle-to-X communications system. Communication of this kind is also known generally as Car2X communication and, as part of an intelligent traffic system, has the object in particular of improving safety in road traffic.

One requirement in a vehicle-to-X communications system consists particularly in achieving a signal coverage of 360 degrees both when transmitting and receiving signals. As a rule, this is implemented with an antenna which is correspondingly arranged in the vehicle. However, if it is not possible to achieve a 360-degree signal radiation of this kind with one antenna due to limited installation space, two antennae are used and are coupled together via a diversity functionality in the corresponding transceiver and, to all appearances, behave like a virtual antenna. However, transceivers with diversity functionality are complicated to produce and are accordingly expensive. Connecting two antennae to a transceiver without diversity functionality is also disadvantageous in technical respects because there is the risk that the signals emitted by the two antennae will interfere with one another and accordingly cancel each other out. Therefore, another possibility is to alternately switch a transceiver without diversity functionality to two antennae such as in WO 2015/121404 A1, incorporated by reference herein, for example. However, this does not achieve a temporally constant signal coverage of 360 degrees.

A further problem consists in the cable-based connection of a vehicle-to-X communications device such as a transceiver to the respective vehicle antenna via which the transceiver transmits its signal or receives a signal. Due to the high frequencies in the range of 5.9 GHz, it is necessary to use suitable high-frequency cables (HF cables) within the vehicle for the connection between a vehicle antenna and a transceiver. However, HF cables of this kind arranged in a vehicle are impractical for several reasons: they are expensive, prone to mechanical stresses, have large and therefore space-consuming bending radii and, in addition, they make it difficult to quickly discern whether it is a defective cable or a communications device that is the source of error should there be a disturbance in the communications system.

SUMMARY OF THE INVENTION

An aspect of the present invention therefore aims to minimize the use of HF cables for the connection between a vehicle antenna and a vehicle-to-X communications system of a vehicle. A further aspect of the present invention is a vehicle-to-X communications system for a vehicle such that an efficient and therefore also relatively inexpensive solution is achieved for a temporally constant signal coverage of 360 degrees with a minimum of technical expenditure. A further aspect of the present invention consists in further developing a vehicle-to-X communications system such that it is rapidly and economically expandable and, accordingly, flexibly adaptable and usable for different technical requirements.

An aspect of the present invention is based on a first fundamental idea that the use of HF cables for providing a signal connection between a vehicle antenna and a vehicle-to-X communications system of a vehicle can be limited to a minimum in that the two transceivers integrated in the vehicle-to-X communications system are installed as close as possible to the antenna of the vehicle. The distance remaining between the vehicle antenna and the transceivers then need only be bridged by an HF cable of minimal length. The connection between the two transceivers, which act substantially independently of one another, and a Car2X vehicle communications device such as, for example, a control device, also known in technical jargon as electronic control unit (ECU), is carried out via the first communications interface and the second communications interface via which the two transceivers are connected, respectively, to the control device. The first communications interface and the second communications interface are preferably configured as digital communications interfaces which comprise a digital bus system or to which a digital bus system of this kind is connectable. Accordingly, even with limited availability of installation space inside of a vehicle, the required length of an HF cable for connecting the two transceivers to their antennae can be limited to a minimum.

A further aspect of the present invention consists in that the two above-mentioned transceivers are operatable independently of one another or interact, and each of the two transceivers communicates via its own communications interface with the control device and, therefore, with the data processing device which is associated with the respective transceiver and which is preferably configured as a stack. The two transceivers can automatically synchronize with one another via the control device when necessary in order, for example, to prevent emission of the same message in the normal operating state via the first antenna and second antenna. As a rule, however, the two transceivers work independently of one another in regards to the transmission and reception of signals via their respective antennae. In this way, each of the two transceivers can be arranged at different locations within the vehicle, which results in a greater flexibility. Moreover, a temporally constant signal coverage of 360 degrees can be achieved in this way because the two transceivers generally transmit and receive their signals independently of one another.

According to a first aspect, the invention relates to vehicle-to-X communications system for a vehicle, comprising a first antenna, a second antenna, a first transceiver for transmitting and receiving a signal, which first transceiver is electrically connectable to the first antenna via a first antenna interface, a second transceiver for transmitting and receiving a signal, which second transceiver is electrically connectable to the second antenna via a second antenna interface, a control device which is connectable to the first transceiver via a first communications interface and to the second transceiver via a second communications interface, and the first transceiver and the second transceiver are configured to communicate with the control device independently of one another and, further, to transmit and receive a signal independent from one another via their first antenna and their second antenna.

An advantage of an aspect of the present invention consists in that a temporally constant signal coverage of 360 degrees is achieved in that the two transceivers are operatable independently of one another, that is, in that, independently of one another, they communicate with the control device and the data processing device which can be configured as a stack in the control device and which is associated with a transceiver in each instance.

Further, the operation of the two transceivers independently of one another advantageously makes it possible for different transceivers which have different characteristics and which are made by different manufacturers to be used in the vehicle-to-X communications system while nevertheless achieving a signal coverage of 360 degrees. This flexibility allows an existing vehicle-to-X communications system to be upgraded or retrofitted with additional technical features in a simple and economical manner when the range of tasks of the vehicle-to-X communications system changes or is to be adapted.

A further advantage of an aspect of the present invention consists in that the length of the HF cable used for connecting the respective transceiver to its vehicle antenna can be limited to a minimum. On the one hand, this is achieved in that the transceiver itself can be placed very close to the respective antenna, which is a result of the respective transceiver being connectable via a digital communications interface to the control device which can be constructed in particular as an ECU. The connection of a transceiver to the ECU via a digital communications interface renders the use of HF cables superfluous.

Further, the use of a digital communications interface for connecting the transceivers to the control device allows the vehicle-to-X communications system to be expanded in a flexible manner or allows additional components to be integrated therein in a simple manner or allows the vehicle-to-X communications system to be adapted if necessary without requiring cumbersome and expensive retrofitting, for example, an additional lengthening of existing HF cable sets. A greater flexibility in platform development is possible in this way because, for example, a second antenna or a further antenna can be integrated into the existing vehicle-to-X communications system very easily.

The vehicle can be a motor vehicle, in particular a passenger vehicle, a truck, a motorcycle, an electric motor vehicle or a hybrid motor vehicle.

According to one embodiment of an aspect of the present invention, the control device has a first data processing device for controlling the first transceiver via the first communications interface and a second data processing device for controlling the second transceiver via the second communications interface. This achieves the advantage that the signal processing for an individual transceiver can be carried out separate from the signal processing of the other transceiver.

The first data processing device and the second data processing device can be configured as stacks. The stacks are generally operatable independently of one another but are capable of synchronizing in a corresponding manner if required. In particular, a stack within the meaning of an aspect of the present invention is a type of protocol software which is configured to convert data or signals or messages of a communication protocol or transport protocol into a format which is usable in applications, i.e., to ensure a traditional protocol processing. Since both stacks are operatable independently of one another, they can be activated or configured when necessary, for example, when adding a further antenna to the vehicle-to-X communications system in order to take into account an altered system configuration. This reduces the multiplicity of Variants and increases the flexibility of the system in a simple manner.

According to one embodiment of an aspect of the present invention, the first communications interface and the second communications interface of the control device are configured in each instance as digital communications interfaces.

In a further embodiment of an aspect of the present invention, these two digital communications interfaces of the control device can preferably comprise a digital bus system in each instance, for example, an LVDS-based or Ethernet-based digital bus system, or are couplable with digital bus systems of this kind.

In a further embodiment of an aspect of the present invention, the first transceiver is preferably connectable to the control device via the first digital communications interface of the control device and the second transceiver is preferably connectable to the control device via the second digital communications interface of the control device. This achieves the advantage that a signal connection of the two transceivers to the control device, i.e., the ECU, with the stacks associated with the latter need no longer be carried out via traditional HF cabling. Further, the two transceivers can be arranged flexibly within the vehicle, i.e., for example, closer to their respective antenna. In this way, the minimum dimension of required HF cabling between antenna and transceiver can be reduced.

According to one embodiment of an aspect of the present invention, the first transceiver is connectable to the control device via the first digital communications interface of the control device, and the second transceiver is an integral component of the control device, i.e., the ECU. This achieves the advantage that the ECU is to be connected directly to the second antenna.

According to one embodiment of an aspect of the present invention, the first transceiver and the second transceiver are configured as an integral component of the control device, i.e., are built into the ECU. Each transceiver can then be signal-specifically connected to its respective antenna in the customary manner by HF cable. This embodiment achieves the advantage that no additional space need be provided for the respective transceiver. This embodiment is particularly suitable when the ECU is placed close to the respective antenna, i.e., for example, in a vehicle in which the unit comprising antenna and associated ECU is installed, for example, in the side mirror or in the rearview mirror or behind the shock absorber of the vehicle in question.

According to one embodiment of an aspect of the present invention, the first transceiver and the second transceiver are configured to define a transmitting pattern for a signal to be transmitted or a message depending on the type of signal to be transmitted and/or depending on a traffic situation and/or depending on determined vehicle parameters. This achieves the advantage that transmitting patterns adapted to the respective situation can be emitted via the respective antenna based on the independent processing of data during transmission and during reception of signals of the two transceivers. In this way, depending on the traffic situation, different spatial target zones in front of or behind the respective antenna of the vehicle can be addressed differently, i.e., can be supplied with signals which differ from one another.

According to one embodiment of an aspect of the present invention, the first transceiver and the second transceiver are configured to alternately transmit their respective signal or their respective message with one half of the frequency duration via their respective antenna. This achieves the advantage that no interference results between the signals emitted via the first antenna and the second antenna. Otherwise, the two transceivers can nevertheless be configured to use the same security certificates and IDs for reasons of efficiency.

According to one embodiment of an aspect of the present invention, the control device is configured to decide, depending on a signal or message received via the first transceiver and/or the second transceiver, whether a signal or a message is transmitted simultaneously via the first transceiver and the second transceiver so as to allow a doubled emission of the same signal via the first transceiver and the second transceiver only when a determined traffic situation exists. This achieves the advantage that doubled bandwidth is used for this signal only when a particular traffic situation occurs, for example, an emergency braking of the vehicle in question.

According to one embodiment of an aspect of the present invention, the first transceiver and the second transceiver are configured to synchronize with one another via the control device depending on the type of signal to be transmitted and/or depending on a traffic situation and/or depending on determined vehicle parameters and driving parameters such that the transmission of a signal via the first transceiver or the second transceiver is sufficient when the respective transceiver has better spatial coverage of a target zone by its respective antenna. The first transceiver and the second transceiver are further configured to synchronize with one another via the control device depending on the type of signal to be transmitted and/or depending on a traffic situation and/or depending on determined vehicle parameters and driving parameters in such a way when the transmission of a signal by the other transceiver via its respective antenna is not sufficient for a complete spatial coverage of a target zone. This achieves the advantage that, for example, in a particular traffic situation, for example, during an emergency braking of the vehicle with the vehicle-to-X communications system, vehicles driving behind this vehicle, that is, those vehicles located in a target zone of, for example, 1000 m behind the vehicle executing the emergency braking, can be alerted in that the respective signal is emitted via the rear antenna of the vehicle.

"Hopping" generally means a relaying of signals and messages from stations, i.e., vehicles located between the transmitting vehicle and the receiving vehicle. In this way, "hopping" is synchronized between the two transceivers, and the required signals or messages are sent via the transceiver which has better spatial coverage of the relevant target zone by its antenna. The data required for this, such as vehicle position, time of occurrence of the event, movement direction of the vehicle or other vehicle data such as vehicle type, are made available to the control device and/or to the respective transceiver by the vehicle IT.

In order to prevent the emission of doubled signals or messages via the first antenna and the second antenna under ordinary circumstances, a so-called association of the received signals and messages through the two transceivers is carried out as a result of the respective application or the transmission of the relevant signals. It is only after this association or combination of the received data that a decision is made as to whether or not a particular situation exists, for example, an emergency braking, and only then is there a corresponding reaction. In this way, the system is prevented from conflicting with itself in transmitting direction, that is, the two transceivers are prevented from unnecessarily taking up all of the doubled transmission bandwidth when no special situation has occurred which makes this necessary.

According to a second aspect, the invention relates to a vehicle having a vehicle-to-X communications system.

BRIEF DESCRIPTION OF THE DRAWINGS

Further embodiment examples will be described more fully referring to the accompanying figures. The drawings show.

DETAILED DESCRIPTION OF THE DRAWINGS

Figure 1:
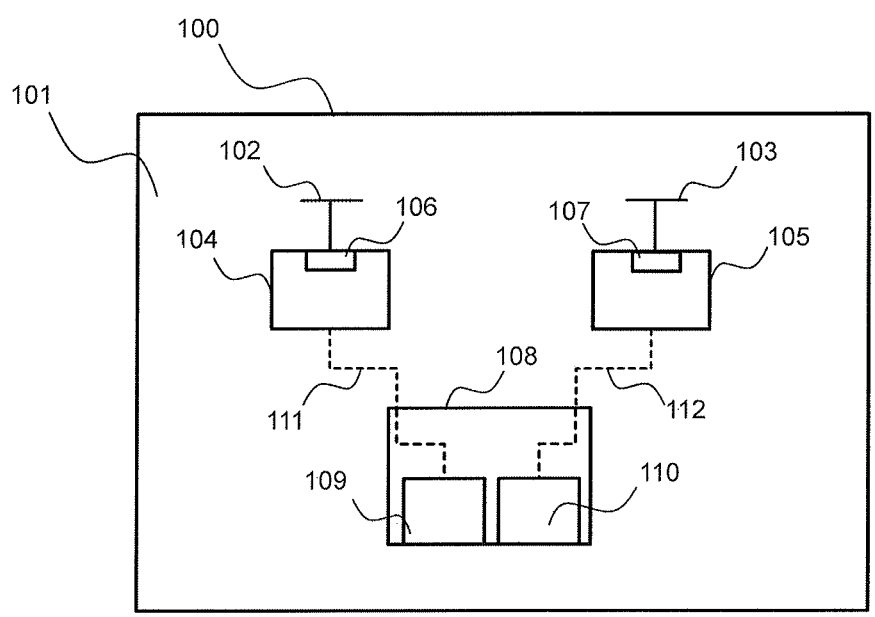
FIG. 1 a schematic diagram of a vehicle-to-X communications system of a vehicle with two transceivers which are connected to the control device via communications interfaces, according to a first embodiment of an aspect of the invention.

FIG. 1 shows a schematic diagram of a vehicle-to-X communications system 101 for a vehicle 100 according to a first embodiment. The vehicle-to-X communications system 101 comprises a first transceiver 104 for transmitting and receiving a signal, which first transceiver 104 is electrically connectable to a first antenna 102 via a first antenna interface 106 which is part of the first transceiver 104, a second transceiver 105 for transmitting and receiving a signal, which second transceiver 104 is electrically connectable to the second antenna 103 via a second antenna interface 107, wherein the second interface 107 is part of the second transceiver 105. The vehicle-to-X communications system 101 further comprises a control device 108 which is connected to the first transceiver 104 via a first communications interface 111 and to the second transceiver 105 via a second communications interface 112. The control device 108 is preferably configured as an electronic control unit (ECU) and can include a microprocessor or a controller (not shown in FIG. 1).

The control device 108 in FIG. 1 comprises a first data processing device 109 for controlling the first transceiver 104 and a second data processing device 110 for controlling the second transceiver 105. The first data processing device 109 and the second data processing device 110 can be configured in each instance as stacks which work independently of one another. That is, an independently working stack 109, 110 is allotted to each transceiver 104, 105.

The control device 108 can be further configured to decide, depending on a received signal or message via the first transceiver 104 and/or the second transceiver 105, whether a signal or a message is transmitted simultaneously via the first transceiver 104 and the second transceiver 105 so as to allow a doubled transmission of the same signal via the first transceiver 104 and the second transceiver 105 only when a determined traffic situation exists.

The first communications interface 111 and the second communications interface 112 can preferably be configured as digital communications interfaces. A digital communications interface can comprise a digital bus system, for example, an Ethernet bus system or an SVDS bus system, or the digital communications interfaces can be coupled with a digital bus system of this kind in each instance. Connecting the respective transceivers 104, 105 to the control device 108 via digital communications interfaces makes it possible to dispense with or minimize impractical HF cables in the vehicle.

The first transceiver 104 and the second transceiver 105 communicate with the control device 108 independently of one another. Moreover, both transceivers 104, 105 are configured, likewise independently of one another, to transmit and receive a signal via their first antenna 102 and their second antenna 103. Accordingly, as a rule, the two transceivers 104, 105 transmit theft signals in a temporally offset manner in order to prevent signal interference. To this end, it may be necessary depending on the situation that the two transceivers 104, 105 must correspondingly synchronize with one another beforehand for the process of transmitting signals. However, the two transceivers 104, 105 can receive signals via the respective antennae 102, 103 completely independently of one another because an association or identification of signals or messages is carried out in the communications system 101 and these signals or messages are associated correspondingly with the respective transceiver 104, 105 so that the received signals need only be processed once. The process of associating signals or messages is also used for transmitting the same message in a doubled manner via two antennae.

Installing two transceivers in a vehicle which are connected to an antenna in each instance but which work substantially independently of one another is advantageous particularly in roofless vehicles, for example, convertibles, because costs for developing a control device which controls both antennae can be saved in this way.

A temporally constant signal coverage of 360 degrees can be achieved in this way with two antennae when it is not possible to achieve a signal coverage of this kind with a single antenna. In order to prevent signal interference which would occur when two transceivers 104, 105 transmit an identical signal at identical times via their respective antennae 102, 103 and accordingly would take up twice the bandwidth, both transceivers 104, 105 are configured to synchronize in a corresponding manner in this exceptional situation. Otherwise, the two transceivers 104, 105 work independently of one another. Nevertheless, situations can arise where it is desirable precisely that the same signal which is highly relevant or important at that time is sent via both antennae 102, 103, for example, when the vehicle 101 in question executes an abrupt emergency braking and the vehicles following it must be alerted in a timely manner to prevent collisions.

The first transceiver 104 and the second transceiver 105 can be further configured to define a transmission pattern for a signal or a message to be transmitted depending on the type of signal to be transmitted and/or depending on a traffic situation and/or depending on determined vehicle parameters.

The first transceiver 104 and the second transceiver 105 can alternately transmit their signal or their message alternately with one half of the frequency duration via their respective antenna 102, 103. In this way, it can be ensured that the signals to be transmitted via the first antenna 102 and the second antenna 103 do not cancel each other out.

While the first transceiver 104 and the second transceiver 105 do not, as a rule, have a diversity functionality, this does not exclude the use of such transceivers in an aspect of the present invention. The use of transceivers with diversity functionality makes sense when a better antenna characteristic is to be achieved or when, due to installation space, one antenna per transceiver, as is shown in FIG. 1, is not sufficient for the required signal coverage of 360 degrees.

The two transceivers 104, 105 can differ from one another with respect to functionality. That is, two different transceivers which have different characteristics and were developed by different manufacturers can be used in the vehicle-to-X communications system 101 according to an aspect of the invention. This allows a greater flexibility of the communications system 101 when the latter must perform additional tasks.

Further, the first transceiver 104 and the second transceiver 105 can be configured to synchronize with one another via the control device 108 depending on the type of signal to be transmitted and/or depending on a traffic situation and/or depending on determined vehicle parameters and driving parameters when the transmission of a signal via the first transceiver 104 or the second transceiver 105 is sufficient, when the respective transceiver 104, 105 has better spatial coverage of a target zone through its respective antenna 102, 103. Traffic situations in which, for example, it is important that the first antenna 102 which may be installed at the rear end of the vehicle 100, emits a corresponding signal can be covered in this way in order to address or reach a particular target zone behind the vehicle 100. In another situation, on the other hand, the second antenna 103 could be selected because of the location in which it is installed within the vehicle in order to address another target zone closer to it because its placement guarantees a better reachability.

Further, the first transceiver 104 and the second transceiver 105 can be configured to synchronize with one another via the control device 108 depending on the type of signal to be transmitted and/or depending on a traffic situation and/or depending on determined vehicle parameters and driving parameters when the transmission of a signal through the other transceiver 104, 105 via its respective antenna 102, 103 is not sufficient for a complete spatial coverage of a target zone.

Figure 2:
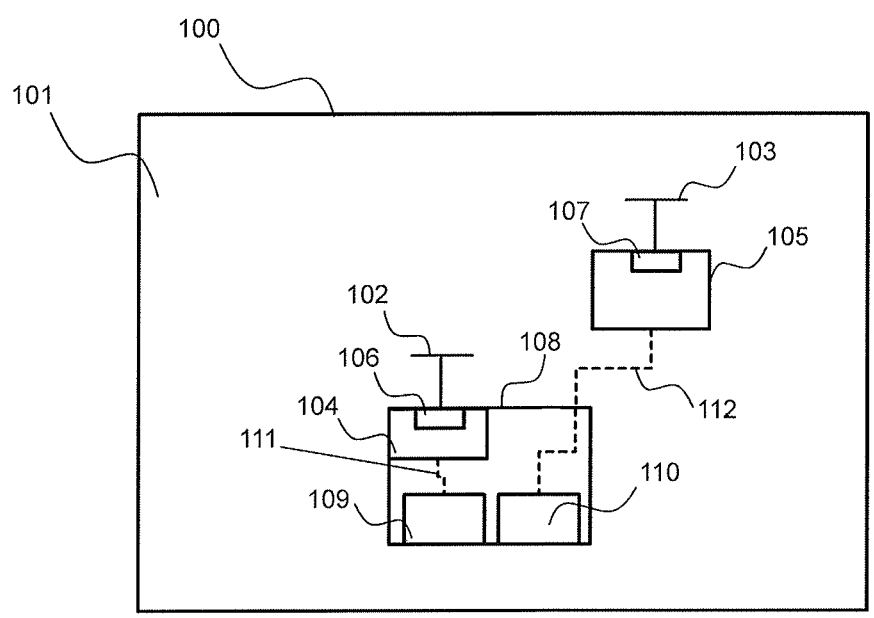
FIG. 2 a schematic diagram of a vehicle-to-X communications system of a vehicle, wherein the first transceiver is arranged in the control device and the second transceiver is arranged outside of the control device via a communications interface, according to a second embodiment of an aspect of the invention.

FIG. 2 shows a schematic diagram of a vehicle-to-X communications system 101 of a vehicle 100 according to a second embodiment of an aspect of the invention. In contrast to the first embodiment according to FIG. 1, the first transceiver 104 is an integral component of the control device 108 in FIG. 2. The second transceiver 105 is connected to the control device 108 via a second communications interface 12 which is preferably digitally configured.

Figure 3:
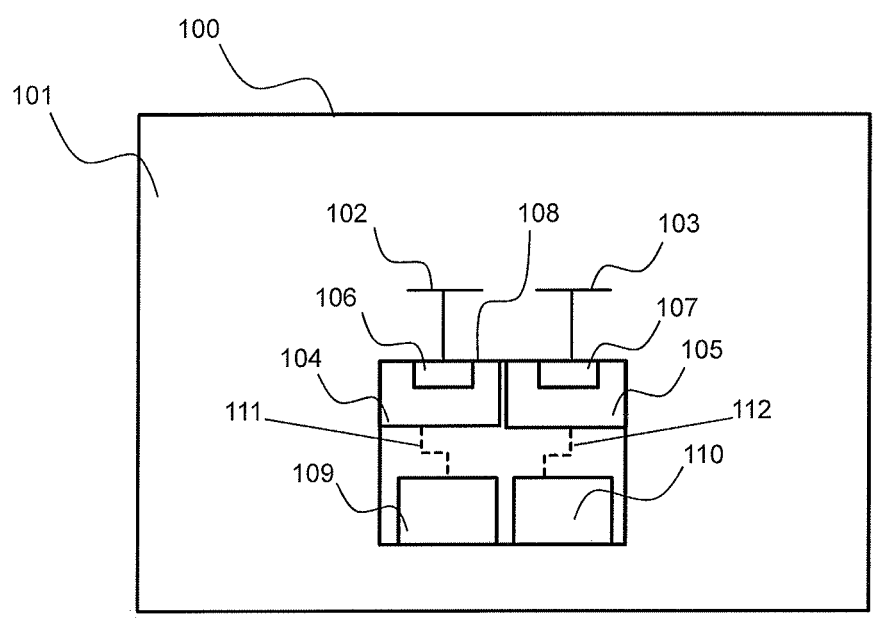
FIG. 3 a schematic diagram of a vehicle-to-X communications system of a vehicle, wherein the first transceiver and the second transceiver are arranged in the control device, according to a third embodiment of an aspect of the invention.

FIG. 3 shows a schematic diagram of a vehicle-to-X communications system 101 of a vehicle 100. In contrast to the embodiment sin FIG. 1 and FIG. 2, the first transceiver 104 and the second transceiver 105 are an integral component of the control device 108. The first transceiver 104 and the second transceiver 105 are connected to their respective stacks 109 and 110 via their respective (digital) communications interfaces 111, 112. The first antenna 102 can be connected to the first transceiver 104 via an HF cable. The second antenna 103 can be connected to the second transceiver 105 via an HF cable. In order to keep the length of the required HF cable as short as possible, it is advantageous to arrange the ECU 108 close to the respective antennae 102, 103.

LIST OF REFERENCE NUMERALS 100 vehicle
101 vehicle-to-X communications system
102 first antenna
103 second antenna
104 first transceiver
105 second transceiver
106 first antenna interface
107 second antenna interface
108 control device
109 first data processing device
110 second data processing device
111 first communications interface
112 second communications interface

The invention claimed is:

1. A vehicle-to-X communications system for a vehicle, comprising:
a first antenna,
a second antenna,
a first transceiver for transmitting and receiving a first signal, which first transceiver is electrically connectable to the first antenna via a first antenna interface,
a second transceiver for transmitting and receiving a second signal, which second transceiver is electrically connectable to the second antenna via a second antenna interface,
a control device which is connectable to the first transceiver via a first communications interface and to the second transceiver via a second communications interface, and wherein
the first transceiver and the second transceiver are configured to:
communicate with the control device independently of one another,
transmit and receive the first signal and the second signal independently of one another via their first antenna and their second antenna,
transmit the first signal and the second signal in a temporally offset manner in response to at least one of a first traffic situation, a first vehicle parameter, a first driving parameter or a first importance of data being transmitted by the first signal and the second signal, and
transmit the first signal and the second signal in a temporally simultaneous manner in response to at least one of a second traffic situation, a second vehicle parameter, a second driving parameter or a second importance of data being transmitted by the first signal and the second signal.

2. The vehicle-to-X communications system according to claim 1, wherein the control device has a first data processing device for controlling the first transceiver via the first communications interface and a second data processing device for controlling the second transceiver via the second communications interface.

3. The vehicle-to-X communications system according to claim 2, wherein the first data processing device and the second data processing device are configured as stacks.

4. The vehicle-to-X communications system according to claim 1, wherein the first communications interface and the second communications interface of the control device are configured in each instance as digital communications interfaces.

5. The vehicle-to-X communications system according to claim 4, wherein the first transceiver is connectable to the control device via the first digital communications interface of the control device, and the second transceiver is an integral component of the control device.

6. The vehicle-to-X communications system according to claim 4, wherein the first transceiver is connectable to the control device via the first digital communications interface of the control device, and the second transceiver is connectable to the control device via the second digital communications interface of the control device.

7. The vehicle-to-X communications system according to claim 4, wherein the two digital communications interfaces of the control device comprise a digital bus system in each instance.

8. The vehicle-to-X communications system according to claim 1, wherein the first transceiver and the second transceiver are configured as an integral component of the control device.

9. The vehicle-to-X communications system according to claim 1, wherein the first transceiver and the second transceiver are configured to define a transmitting pattern for a signal to be transmitted or a message depending on the type of signal to be transmitted and/or depending on a traffic situation and/or depending on determined vehicle parameters.

10. The vehicle-to-X communications system according to claim 1, wherein the first transceiver and the second transceiver alternately transmit their respective signal or their respective message with one half of the frequency duration via their respective antenna.

11. A vehicle-to-X communications system for a vehicle, comprising:
a first antenna,
a second antenna,
a first transceiver for transmitting and receiving a signal, which first transceiver is electrically connectable to the first antenna via a first antenna interface,
a second transceiver for transmitting and receiving a signal, which second transceiver is electrically connectable to the second antenna via a second antenna interface,
a control device which is connectable to the first transceiver via a first communications interface and to the second transceiver via a second communications interface, and wherein
the first transceiver and the second transceiver are configured to:
communicate with the control device independently of one another, and
transmit and receive a signal independently of one another via their first antenna and their second antenna,
wherein the control device is configured to decide, depending on a signal or message received via the first transceiver and/or the second transceiver, whether a signal or a message is transmitted simultaneously via the first transceiver and the second transceiver so as to allow a doubled emission of the same signal via the first transceiver and the second transceiver only when a determined traffic situation exists.

12. A vehicle-to-X communications system for a vehicle, comprising:
   a first antenna,
   a second antenna,
   a first transceiver for transmitting and receiving a signal, which first transceiver is electrically connectable to the first antenna via a first antenna interface,
   a second transceiver for transmitting and receiving a signal, which second transceiver is electrically connectable to the second antenna via a second antenna interface,
   a control device which is connectable to the first transceiver via a first communications interface and to the second transceiver via a second communications interface, and wherein
   the first transceiver and the second transceiver are configured to:
      communicate with the control device independently of one another, and
      transmit and receive a signal independently of one another via their first antenna and their second antenna,
   wherein the first transceiver and the second transceiver are configured to synchronize with one another via the control device depending on the type of signal to be transmitted and/or depending on a traffic situation and/or depending on determined vehicle parameters and driving parameters such that the transmission of a signal via the first transceiver or the second transceiver is sufficient when the respective transceiver has better spatial coverage of a target zone by its respective antenna, and wherein the first transceiver and the second transceiver are further configured to synchronize with one another via the control device depending on the type of signal to be transmitted and/or depending on a traffic situation and/or depending on determined vehicle parameters and driving parameters such that when the transmission of a signal by the other transceiver via its respective antenna is not sufficient for a complete spatial coverage of a target zone.

13. A vehicle having a vehicle-to-X communications system according to claim 1.

14. The vehicle-to-X communications system according to claim 2, wherein the first communications interface and the second communications interface of the control device are configured in each instance as digital communications interfaces.

15. The vehicle-to-X communications system according to claim 3, wherein the first communications interface and the second communications interface of the control device are configured in each instance as digital communications interfaces.

16. The vehicle-to-X communications system according to claim 5, wherein the two digital communications interfaces of the control device comprise a digital bus system in each instance.

17. The vehicle-to-X communications system according to claim 6, wherein the two digital communications interfaces of the control device comprise a digital bus system in each instance.

18. The vehicle-to-X communications system according to claim 2, wherein the first transceiver and the second transceiver are configured as an integral component of the control device.

19. The vehicle-to-X communications system according to claim 3, wherein the first transceiver and the second transceiver are configured as an integral component of the control device.

* * * * *